United States Patent [19]

Bruning

[11] Patent Number: 5,003,454
[45] Date of Patent: Mar. 26, 1991

[54] POWER SUPPLY WITH IMPROVED POWER FACTOR CORRECTION

[75] Inventor: Gert W. Bruning, Tuckahoe, N.Y.

[73] Assignee: North American Philips Corporation, New York, N.Y.

[21] Appl. No.: 462,682

[22] Filed: Jan. 9, 1990

[51] Int. Cl.$^5$ .......................... H02M 7/06; G05F 1/70
[52] U.S. Cl. ...................................... 363/81; 323/222; 363/89
[58] Field of Search .................... 323/222; 363/80, 81, 363/89

[56] References Cited

U.S. PATENT DOCUMENTS

| | | | |
|---|---|---|---|
| 4,816,982 | 3/1989 | Severinsky | 363/89 |
| 4,837,495 | 6/1989 | Zansky | 323/222 |
| 4,940,929 | 7/1990 | Williams | 363/81 |

FOREIGN PATENT DOCUMENTS

| | | | |
|---|---|---|---|
| 293969 | 12/1987 | Japan | 363/81 |
| 55612 | 3/1988 | Japan . | |
| 152964 | 6/1989 | Japan . | |
| 186167 | 7/1989 | Japan . | |

Primary Examiner—William H. Beha, Jr.
Attorney, Agent, or Firm—Bernard Franzblau

[57] ABSTRACT

A regulated voltage converter circuit includes a storage inductor and a controlled semiconductor switch connected in series circuit to a pair of input terminals that supply a full wave rectified voltage of a sinusoidal 60 Hz AC input voltage. A power factor amplifier receives a divided part of the rectified voltage and produces an output control voltage $V_M$ of a predetermined waveform (FIG. 2c). A comparison circuit compares the control voltage $V_M$ with a ramp voltage that is proportional to the current flowing through the semiconductor switch. The comparison circuit supplies PWM pulses to a control electrode of the semiconductor switch so as to regulate the output voltage of the converter circuit. The control voltage ($V_M$) waveform is chosen so as to produce near unity power factor correction at the input of the converter circuit.

15 Claims, 3 Drawing Sheets

POWER SUPPLY WITH IMPROVED POWER FACTOR CORRECTION

BACKGROUND OF THE INVENTION

This invention relates to a switched power regulator having improved power factor correction apparatus.

Various power supply systems are known which incorporate a switched power regulator, such as the boost converter, the buck converter and the buck-boost converter. A problem with these conventional converters is that they do not provide inherent power factor correction. Adding the capability of power factor correction increases the size, complexity and cost of these devices.

One known type of converter is the current programmed DC boost converter operating in the discontinuous conduction mode, as is shown in FIG. 1, and which will be discussed in greater detail below. This converter generates a control signal ($V_M$) for regulating the average value of the output voltage, $V_{out}$, while providing power factor correction such that the converter draws a sinusoidal current from the input lines, for example, the 120 volt AC/60 Hz power lines commonly available. The control voltage $V_M$ generated therein satisfies the following expression $$V_M = \sqrt{\frac{2L\hat{i}_{in}}{V_{in}} \cdot \frac{V_{out} - V_{in}(t)}{V_{out}}} \tag{1}$$

and produces a near unity power factor apparatus. In the foregoing expression, L is the inductance of the series inductor, $\hat{i}_{in}$ is the maximum amplitude of the input current to the boost converter, $\hat{V}_{in}$ is the maximum amplitude of the converter input voltage and $V_{out}$ is the regulated output voltage thereof. A disadvantage of this apparatus is that its control circuit with power factor correction is rather complicated since it requires an adder (substractor) circuit, a multiplier, a square root generator and a fixed ramp sawtooth generator. Another drawback is that it does not inherently provide over current protection for the transistor switch, especially in the case of a voltage transient from the 120 volt AC input lines, because it does not provide control of the switch current on a pulse by pulse basis.

Additional background information on switching regulator circuits can be obtained from U.S. Pat. No. 4,311,954 (Jan. 19, 1982) and U.S. Pat. No. 4,471,291 (Sept. 11, 1984).

SUMMARY OF THE INVENTION

It is therefore an object of the invention to provide a power supply system which operates at near unity power factor by means of a relatively simple and inexpensive control circuit.

Another object of the invention is to provide a current programmed boost converter operative in a discontinuous conduction mode in which a control signal ($V_m$) is generated having a waveform uniquely designed so that the converter draws a sinusoidal current from the 60 Hz AC input lines.

A further object of the invention is to provide a power converter with inherent current protection for the converter switch by the provision of high frequency cycle-by-cycle current control.

A still further object of the invention is to provide a relatively simple circuit for generating a control signal ($V_M$) with a unique waveform adapted to provide a near unity power factor regulated converter.

The above objects and other objects and advantages of the invention are achieved by the provision of a regulated power converter employing current mode control and operating in a discontinuous conduction mode and which generates a control voltage ($V_M$) that satisfies the following expression, $$V_M = V_{in}(t) \sqrt{V_{out} - V_{in}(t)} \cdot \sqrt{\frac{2\hat{i}_{in}T_{sw}R_s}{V_{out}LV_{in}}} \tag{2}$$

where $T_{sw}$ is the period of a high frequency (e.g. 30 KHz) switching signal for operation of the transistor switch, $R_s$ is the resistance value of a sense resistor connected in series with the transistor switch and $V_{in}(t)$ is the AC line input voltage. From the above formula, it would appear that for control of the transistor switch a fairly complicated circuit would be required, consisting of at least a summation circuit, two multipliers and a square root generator.

In accordance with the invention, a very simple, so-called power amplifier circuit is provided for generating the control voltage ($V_M$) contained in the above expression (2). The control voltage $V_M$ is generated by a unique circuit that requires only three resistors, a bipolar transistor and a diode. The provision of this unique power amplifier circuit eliminates the summation circuit, the square root generator, and requires only one multiplier.

The use of the novel power amplifier circuit in the power converter achieved a power factor greater than 0.97 for a 70 watt load with an AC line voltage in a voltage range between 85 V and 135 V. A typical power factor is 0.985.

A clocked flip-flop can be used in order to provide pulse-by-pulse current control of the converter, but is not required for the power factor correction described above.

Assuming a clock frequency of 30 KHz, the inductor current consists of a sequence of current pulses at 30 KHz of varying amplitude which exhibits a modulation envelope that is directly produced by the control voltage $V_M$ so as to current program the transistor switch and thus the inductor current. In the prior art circuit (FIG. 1) the control voltage does not have a proportional relationship to the envelope of the inductor current and thus responds very slowly to changes in the line input voltage since such changes must first be sensed at the output by a slow responding error amplifier. This allows an overshoot to occur. The control waveform of the invention is different from that of the prior art because the switch current now is used directly for control purposes.

DESCRIPTION OF THE PREFERRED EMBODIMENTS

Figure 1:
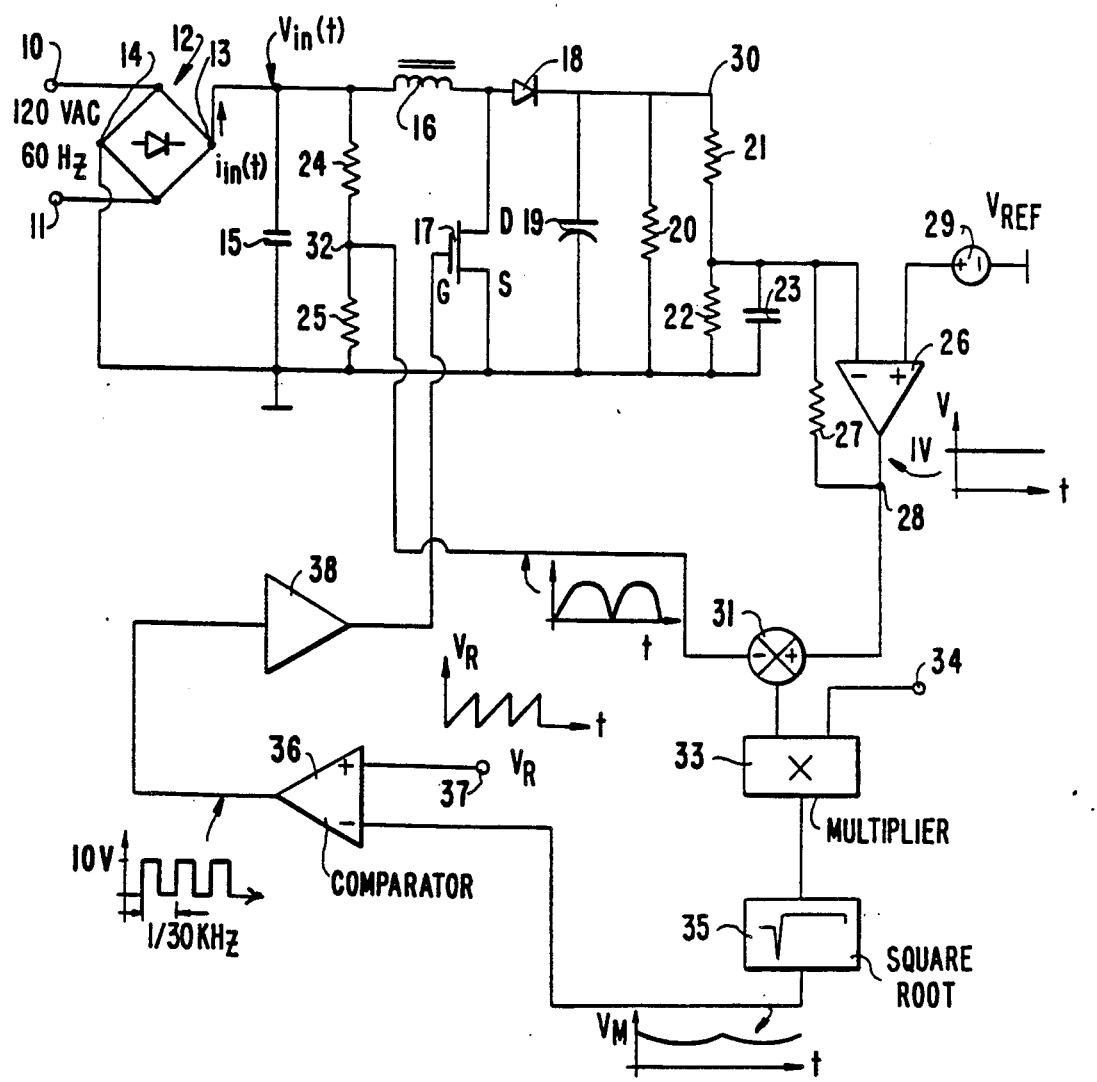
FIG. 1 is a block-schematic diagram of a prior art boost converter with P.F. correction.

FIG. 1 shows a basic type of power converter known in the art as a boost voltage regulator or converter. The purpose of this boost converter is to convert an AC input voltage into a regulated DC output voltage of increased amplitude. The boost converter has a pair of input terminals 10, 11 for connection to a source of AC supply voltage, such as the 120 volt AC 60 Hz voltage which is in common use today. A full wave rectifier 12 converts the sinusoidal AC supply voltage into a full wave rectified voltage which is positive at output terminal 13 of the rectifier. The negative output terminal 14 is connected to ground. A storage capacitor 15 is connected across the output terminals 13, 14 of the full wave rectifier.

An energy storage inductor 16 of inductance value L is connected in series circuit with a controlled regulating switch 17 across the storage capacitor 15. The power switch 17 is a field effect transistor (FET), but other forms of controlled power switch may be used, such as a bipolar transistor, etc. A further series circuit consisting of a semiconductor diode 18 and a shunt capacitor 19 are connected in parallel with the FET switch 17.

A load, which for the purpose of explanation may consist of a resistor 20, is in turn connected across the capacitor 19. A voltage divider including series connected resistors 21 and 22 is connected in parallel with the load resistor 20. A capacitor 23 is connected in shunt with the resistor 22. A further voltage divider consisting of series connected resistors 24, 25 is coupled in shunt with the capacitor 15.

A control circuit for the boost converter includes an error amplifier 26 which has a feedback resistor 27 connected between its inverting input (−) and its output 28. The inverting input of the error amplifier is connected to a junction point between resistors 21 and 22 and the non-inverting input (+) of the amplifier is connected to the positive terminal of a DC source of reference voltage 29. The negative terminal of the reference voltage source is connected to ground.

The control circuit has a dual function. It must regulate the average value of the output voltage, $V_{Out}$, at the output or load terminal 30 and it must produce an input current $i_{in}(t)$ at the input terminal 13 which is in phase with the input voltage $V_{in}(t)$ at said input terminal, and of the same waveshape. This can be achieved by using the proper pulse width modulation (PWM) scheme.

The control circuit also includes a summation device 31 which has first and second inputs connected to output terminal 28 of the error amplifier and to the junction point 32, respectively, in order to combine, i.e. in this case to subtract, the signals developed at the terminals 28 and 32.

In accordance with the formula (1) above, and as will become clear from the description below, the output signal of the summation stage 31 has to be multiplied by a constant. Therefore, the output of the summation device is connected to one input of a multiplier circuit 33, which has a second input coupled to a terminal 34 which receives a constant reference voltage.

Formula (1) above also requires that the square root of the output signal of the multiplier circuit be derived. The output of the multiplier circuit is thus connected to the input of a square root generator circuit 35 which has its output connected in turn to one input (−) of a comparator circuit 36. The (+) input of the comparator is connected to a terminal 37 which receives a reference voltage having a sawtooth waveform. For the generation of the sawtooth, a clock and a ramp generator are required which are standard and are therefore not shown in FIG. 1. Also, conventional PWM control circuits require a flip-flop (latch), which is not shown in FIG. 1 since it too is standard.

The output of the comparator circuit 36 is coupled to the control electrode or gate of the semiconductor switch 17 via a buffer amplifier 38.

In the operation of the boost converter of FIG. 1, assume that the FET switch 17 is initially open. The AC input voltage (120 V, 60 Hz) at terminals 10, 11 is rectified by the bridge rectifier 12. The capacitors 15 and 19 each charge up to the peak value of the input line voltage. The capacitor 19 is charged via the inductor 16 and the diode 18, while the load resistor 20 at the same time loads this capacitor. At the charging frequency of 120 Hz, the inductance L of the inductor 16 causes the inductor to operate practically as a short circuit.

After the capacitor 19 is fully charged, the controlled switch 17 is made to operate in the well-known pulse width modulation mode. At turn-on of switch 17, the instantaneous value of the input voltage $V_{in}(t)$ is placed across the inductor 16. The current flowing through this inductor ramps up approximately linearly until the switch 17 is turned off. When the switch is opened (FET cut-off), the inductor will attempt to maintain the flow of current and thus a reversal of voltage will appear across the inductor. Since the value of the output voltage at this time is about equal to the input voltage, the inductor voltage must swing higher in order to overcome the forward voltage drop of the diode 18. The inductor then can discharge into the output circuit 19 and 20. Once the discharge is complete, the cycle can be repeated.

In the case of electronic ballasts, the FET switch is operated at a much higher frequency than 120 Hz, typically approximately 30 KHz. A regulated output voltage thus can be achieved which is higher in value than the maximum value of the voltage at the input. The mode described is referred to as the discontinuous conduction mode since the inductor is allowed to discharge completely into the output circuit.

In order for the control circuit of the boost converter to provide unity power factor correction, the input current must be in phase with the input voltage and have the same waveshape. Power factor correction in the discontinuous conduction mode requires that the capacitance value C1 of the capacitor 15 be much smaller than the capacitance value C2 of the capacitor 19. For example, for a load resistor 20 with a resistance value R1=750 ohms, an appropriate choice would be C1=1 μF and C2=100 μF. The choice of the inductor value depends on the value of the load resistor, the value of the pulse width modulating frequency (e.g. 30 KHz) and the operation mode, which in this case is discontinuous conduction. A typical value in the above example is L=0.6 mH.

Using the choice of values given, the operation of the control circuit shown in FIG. 1 can be explained. The pulse width modulation (PWM) operation of the control circuit is self-adjusting in the control circuit shown in FIG. 1. The sense resistors 24 and 25 form a simple voltage divider to reduce the input voltage to a level generally acceptable for low voltage control. Furthermore, the sense resistors 21 and 22 along with capacitor 23 divide the output voltage to a low value and also form a low pass filter in order to average the sense signal and thus present the average value of the output voltage to the inverting input of the error amplifier 26.

The error amplifier is used for proper scaling of this value. The input voltage signal at junction 32 and the scaled output voltage signal from the error amplifier are substracted in the summation device 31 and the output signal of the summation stage is multiplied with a constant in accordance with the formula (1) above in the multiplier circuit 33. It is next required to take the square root of the output signal of the multiplier. This is accomplished in the square root circuit 35.

Figure 2A:
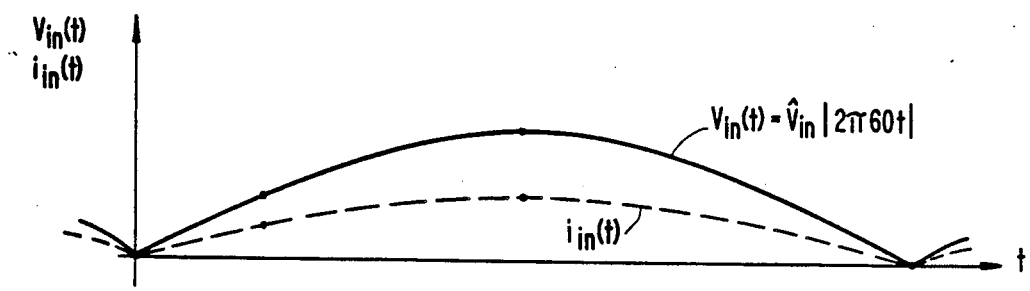
FIGS. 2a, 2b and 2c illustrate voltage waveforms as a function of time useful for an understanding of the invention.
Figure 2B:
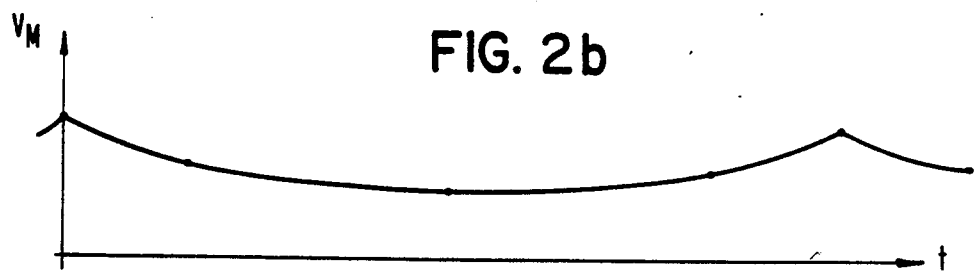

The output of the square root stage is a voltage $V_M$ which has a waveform as shown in FIG. 2b. The voltage waveform $V_M$ in FIG. 2b is generated by subtracting the subdivided part of the rectified line voltage at junction 32 from the average voltage produced by the error amplifier. This is done by the summation circuit. After this summation, a multiplication with a constant is performed in the multiplier. This represents the fixed value of the constants in the control formula (1). The rectified input voltage $V_{in}(t)$ is shown in FIG. 2a.

The signal $V_M$ contains the information for adjusting the duty cycle of the pulse width modulator to achieve the desired goals of regulation of the output voltage with near unity power factor correction of the input current $i_{in}(t)$. The average value of $V_M$ over one low frequency period (1/120 Hz) thus represents the value of the output voltage such that the dynamic component of $V_M$ now contains the information to control or adjust the duty cycle to achieve near unity power factor correction.

The signal voltage $V_M$ is compared in comparator 36 to a fixed ramp (sawtooth) voltage applied to terminal 37. The output signal of the comparator is a 30 KHz sequence of rectangular voltage pulses which are applied to the control electrode of the FET switch 17 via the buffer amplifier 38. The duty cycle of these pulses is controlled to provide voltage regulation of the output voltage of the boost converter along with power factor correction of the input current.

This known circuit has a number of drawbacks. It requires a square root generator, a fixed ramp generator and a summation stage. Furthermore, it does not provide over-current protection for the switch 17, which could occur during a transient in the line voltage whereby the 120 V AC jumps momentarily to 132 V AC. This will also permit an overshoot in the output voltage $V_{out}$ since the speed of the control loop which senses the output voltage is very slow (much slower than the time period 1/120 Hz). This could adversely affect the load which is generally not a simple resistor 20 such as shown in FIG. 1. Furthermore, the current in the switch 17 is only determined by the length of time it is closed, the value of the inductor L, and the instantaneous value of the input voltage $V_{in}(t)$. In the event of a fault at the output, saturation of the inductor core may occur producing excessive current values in the switch which could destroy it. The apparatus of FIG. 1 does not provide control of the switch current on a pulse-by-pulse basis.

Figure 3:
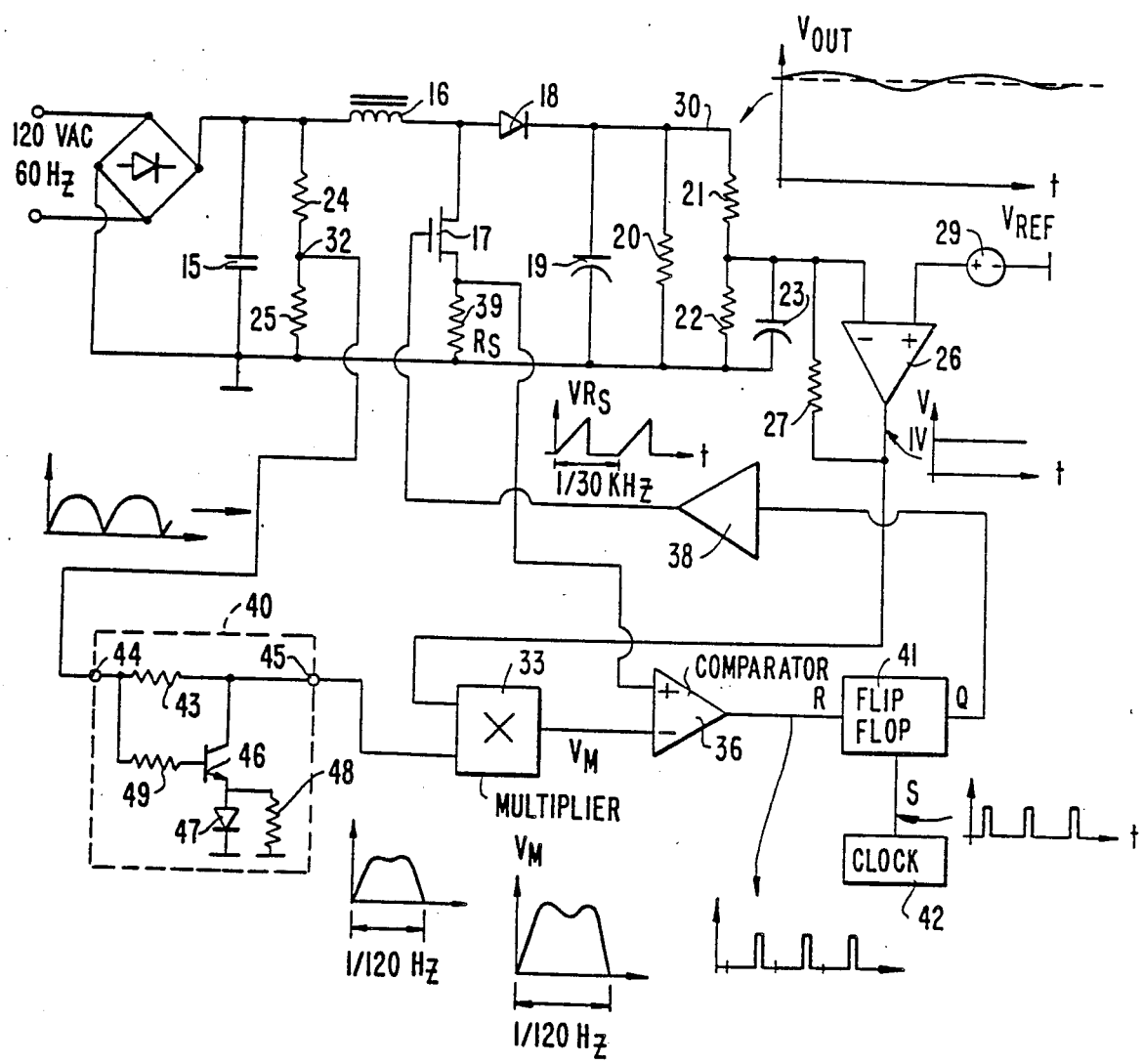
FIG. 3 illustrates a block-schematic diagram of a preferred embodiment of the invention.

FIG. 3 illustrates a voltage boost converter in accordance with the invention. Elements with the same functional attributes as those of FIG. 1 have the same reference numerals.

The power converter part of FIG. 3 consists of the same elements as the power converter section of FIG. 1 except that a sense resistor 39 has been added in series with the semiconductor switch 17. This does not have to be a discrete sense resistor but could be integrated into the switch (sometimes referred to as a Sense FET). A separate resistor is shown here for the sake of simplicity.

In the circuit of FIG. 3, the current programmed mode of operation has been employed. In this mode, the expression for the control voltage $V_M$ is changed since this circuit does not perform a comparison against a fixed slope ramp voltage, as in the circuit of FIG. 1. As noted above, the expression for the control voltage $V_M$ for the circuit of FIG. 3 is now $$V_M = V_{in}(t) \sqrt{V_{out} - V_{in}(t)} \cdot \sqrt{\frac{2 i_{in} T_{sw} R_s}{V_{out} L V_{in}}} \qquad (2)$$

The actual switch current is now used for comparison with the control voltage $V_M$ and the slope of the switch current in the current program mode for power factor correction changes at each switching cycle. It can be seen from the formula (2) that control of the power switch 17 requires a summation circuit, two multipliers and a square root generator. Therefore, to implement formula (2) requires a substantial number of circuit components. The invention to be described hereafter provides the same overall function by means of a much simpler control circuit that requires fewer components than that of the circuit FIG. 1 or that would appear to be necessary from the formula (2) above.

In circuit of FIG. 3, the output signal of the error amplifier 26 is now connected directly to one input of the multiplier 33', rather than to a summation device as in FIG. 1. The other input of the multiplier is now connected to the output of a novel power factor amplifier 40. The junction point 32 of the voltage divider 24, 25 is connected to the input of the power factor amplifier 40 rather than to the summation devices as in FIG. 1.

Figure 2C:
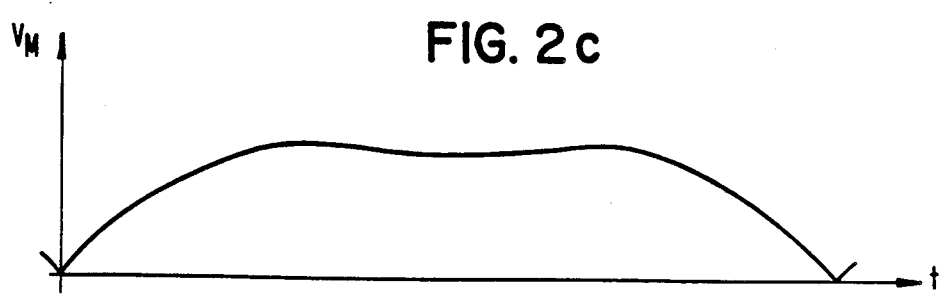

The output signal $V_M$ of the multiplier 33' resembles a crest indented rectified sine wave and is shown in FIG. 2c. The voltage $V_M$ is applied to the inverting input $(-)$ of the comparator 36, whereas the non-inverting input $(+)$ thereof is connected to the sense resistor 39. The comparator 36 now compares the control voltage $V_M$ having the waveform as shown in FIG. 2c with a fixed frequency variable ramp voltage developed across the sense resistor 39.

The output of the comparator 36 is a sequence of rectangular pulses which are applied to the reset input R of a flip-flop 41. A source of clock pulses 42 (e.g. at a frequency of 30 KHz) is coupled to the set input S of the flip-flop. The output of flip-flop 41 is coupled to the control electrode of the control switch 17 via the buffer amplifier 38.

The operation of the boost converter part of the circuit is similar to that of the boost converter part of the FIG. 1 apparatus. The operation of the semiconductor controlled switch 17 is initiated after capacitors 15 and 19 are charged to about the peak value of the rectified line voltage by the clock 42 and the flip-flop 41 which operate at a constant frequency (e.g. 30 KHz). This will close the switch 17.

The current that now flows through inductor 16 and switch 17 is designed to increase nearly linearly, as will the current in the sense resistor 39. The resultant voltage drop across the sense resistor is compared in the comparator 36 to the control voltage $V_M$ produced by the power factor amplifier circuit 40 and the multiplier circuit 33'. When this voltage drop becomes equal to the voltage $V_M$, the comparator output goes high and triggers the flip-flop 41 into the reset state. The flip-flop output (Q) then turns-off the switch 17 very rapidly via the buffer amplifier. This occurs at a rate much faster than the switching period. The output voltage of the comparator consists of rectangular voltage pulses of, for example, 10 V amplitude. The pulse width is dependent on the relationship of the control voltage $V_M$ to the ramp voltage at the sense resistor 39. The ramp voltage at the +input of the comparator 36 does not have to be synchronized to the 60 Hz AC input supply voltage. The flip-flop and the clock source are only needed for the pulse-by-pulse current control, but are not required for the operation of the power factor amplifier or the actual power factor correction.

It will therefore be apparent that in contrast to the circuit of FIG. 1, the circuit of FIG. 3 does not make a comparison to a fixed sawtooth voltage, but instead the switch current ramp itself is used for the comparison function. This provides the important advantage of high frequency cycle-by-cycle current control and thereby provides inherent protection against an overload current in the transistor switch.

One would expect from the control law formula (2) that a square root operation, a multiplication by a constant and a multiplication with the variable input voltage $V_{in}$(t) would be required. I have discovered, however, that the dynamic component of the control law (2) can be generated by means of the simple power factor amplifier circuit 40. As in the circuit of FIG. 1, only the average value of the output voltage is needed for scaling purposes at one input of the multiplier circuit 33'.

The power factor amplifier includes a first resistor 43 (e.g. 820 ohms) connected between its input terminal 44 and its output terminal 45. A bipolar transistor 46 and a parallel circuit including a diode 47 and a resistor 48 (e.g. 2K ohms) are connected in series circuit between the output terminal 45 and a point of reference, ground. A second resistor 49 (e.g. 10K ohms) is connected between the input terminal 44 and the base of transistor 46.

The power factor amplifier 40 produces the dynamic component of the control voltage $V_M$. The divided input voltage $V_{in}$ (t) at junction point 32 is applied to input terminal 44 of the power factor amplifier circuit. The transistor 46 draws no current unless the voltage at the junction point 32 exceeds the sum of the voltage drops of the diode 47 and the base-emitter voltage of the transistor. By proper dimensioning of the resistors 43, 49 and 48 the "dip" in the voltage at the collector of transistor 46 can be achieved so as to derive the waveform shown in FIG. 2c. Thus, the function of transistor 46 is to start inverting the voltage signal from the junction point 32 which appears at its collector when this voltage reaches its peak value, or close to it. This is the function needed by the derived control law as shown in formula (2). The average value of the converter output voltage is measured by the error amplifier and scaled as in the circuit of FIG. 1 in order to scale or "stretch" the dynamic signal for load and line input variations. In this way the circuit can operate over a wide range of input and output load conditions. The product derived by the multiplier 33' thus forms the control $V_M$ of FIG. 2c.

The dynamic component of the control voltage is thus derived by means of an extremely simple and inexpensive circuit. The simple power factor amplifier circuit effectively accomplishes a summation, a square root function and eliminates one multiplication operation. It also allows the use of the current programmed mode of operation along with its attendant advantages.

The use of current mode control as opposed to voltage mode control is not essential to the invention, but is used here in view of its superior results. According to the invention, the prior art summation circuit, the square root circuit and the fixed ramp generator are eliminated. Only one multiplication step now is required. A step increase in the voltage at the input of the converter, e.g. from 120 V AC to 132 V AC, will increase the slope of the ramp current in the transistor switch 17 which thus reaches the value of the voltage $V_M$ faster, permitting no over-current and thus no overshoot at the output.

Tests performed on this novel circuit realized a power factor greater than 0.97 for a 70 W load over a line voltage range of 85 V AC to 135 V AC. A typical value for the power factor is 0.985.

Although I have described my invention in connection with one preferred embodiment thereof, it will be apparent to those skilled in the art that various modifications and changes can be made in both the voltage converter and the controller apparatus of this invention without departing from the scope and spirit thereof and that the controller can be applied to other types of regulator apparatus.

What is claimed is:

1. An electronic voltage control device comprising:
   a converter circuit including an inductor and a semiconductor controlled switch coupled to a pair of input terminals for a periodically varying voltage and further coupled to a load output terminal,
   a power factor amplifier having an input coupled to at least one of said input terminals for receiving at least a part of said periodic voltage, said power factor amplifier including means responsive to said periodic voltage for generating a control voltage $V_M$ having a prescribed waveform,
   a comparison device having a first input coupled to an output of the power factor amplifier and a second input responsive to a voltage determined by current flow through said semiconductor switch, said voltage being independent of current flow in said load output terminal, and
   means coupling pulse width modulated voltage pulses developed at an output of the comparison device to a control electrode of the semiconductor switch thereby to control the switching period thereof in a manner so as to regulate the output voltage at said converter circuit output terminal and to provide power factor correction of an input current supplied to said converter circuit input terminals.

2. A voltage control device as claimed in claim 1, further comprising a full wave rectifier circuit coupled to said input terminals for supplying a full wave rectified voltage at twice the frequency of said periodic voltage to said inductor and to said semiconductor switch, and wherein
   said prescribed waveform of the control voltage $V_M$ is modified relative to the waveform of said periodic voltage.

3. A voltage control device as claimed in claim 2, wherein said inductor and said semiconductor switch are connected in series circuit with one another, a rectifier and a capacitor connected in a second series circuit across the semiconductor switch, and wherein said load output terminal is connected to a junction point between said rectifier and said capacitor.

4. An electronic voltage control device comprising:

a converter circuit including an inductor and a semiconductor controlled switch coupled to a pair of input terminals for a periodic rectified sinusoidal AC voltage and further coupled to a load output terminal, a power factor amplifier having an input coupled to at least one of said input terminals for receiving at least a part of said periodic voltage, said power factor amplifier including means responsive to said periodic voltage for generating a control voltage $V_M$ having a prescribed waveform which approximates a crest indented rectified sine wave, a comparison device having a first input coupled to an output of the power factor amplifier and a second input responsive to a voltage determined by current flow through said semiconductor switch, and means coupling pulse width modulated voltage pulses developed at an output of the comparision device to a control electrode of the semiconductor switch thereby to control the switching period thereof in a manner so as to regulate the output voltage at said converter circuit output terminal and to provide power factor correction of an input current supplied to said converter circuit input terminals.

5. A voltage control device as claimed in claim 4, wherein said switching of the semiconductor switch produces high frequency current pulses through the inductor of varying amplitude to produce an inductor current envelope which is proportional to the control voltage $V_M$.

6. A voltage control device as claimed in claim 4, further comprising a scaling device coupled between said output of the power factor amplifier and the first input of the comparison device.

7. A voltage control device as claimed in claim 6, wherein said scaling device comprises a multiplier circuit having a first input coupled to the output of the power factor amplifier, a second input coupled to a source of DC reference voltage, and an output coupled to said first input of the comparision device.

8. A voltage control device as claimed in claim 6, further comprising a bistable device having a first input coupled to the output of the comparison device, a second input coupled to a source of clock pulses of a frequency much higher than the frequency of said AC voltage, and an output coupled to said control electrode of the semiconductor switch.

9. An electronic voltage control device comprising:

a converter circuit including an inductor and a semiconductor controlled switch coupled to a pair of input terminals for a periodically varying voltage and further coupled to a load output terminal, a sense resistor connected in series with said semiconductor switch so as to derive a ramp voltage determined by current flow through the semiconductor switch, a power factor amplifier having an input coupled to at least one of said input terminals for receiving at least a part of said periodic voltage, said power factor amplifier including means responsive to said periodic voltage for generating a control voltage $V_M$ having a prescribed waveform, a comparison device having a first input coupled to an output of the power factor amplifier and a second input responsive to said ramp voltage, and means coupling pulse width modulated voltage pulses developed at an output of the comparison device to a control electrode of the semiconductor switch thereby to control the switching period thereof in a manner so as to regulate the output voltage at said converter circuit output terminal and to provide power factor correction of an input current supplied to said converter circuit input terminals.

10. A voltage control device as claimed in claim 9, wherein said inductor and said semiconductor switch are connected in series circuit with one another, said voltage control device further comprising:

a full wave rectifier circuit coupled between said input terminals and said series circuit, a first voltage divider connected across output terminals of said rectifier circuit, a second voltage divider connected to said load output terminal, a scaling device coupled between said output of the power factor amplifier and the first input of the comparison device, wherein an input of said scaling device is controlled by a voltage proportional to a voltage developed at an output terminal of the second voltage divider, and wherein said input of the power factor amplifier is coupled to an output terminal of the first voltage divider for receiving said part of the periodic voltage.

11. An electronic voltage control device comprising:

a converter circuit including an inductor and a semiconductor controlled switch coupled to a pair of input terminals for a periodically varying voltage and further coupled to a load output terminal, a power factor amplifier having an input coupled to at least one of said input terminals for receiving at least a part of said periodic voltage, said power factor amplifier including an output, a first impedance element connected between the input and the output of the power factor amplifier, a transistor and a rectifier device connected in series circuit between said output of the power factor amplifier and a point of reference potential, a second impedance element connected between said input of the power factor amplifier and a control electrode of the transistor, and a third impedance element connected in parallel with said rectifier device, said power factor amplifier being responsive to said periodic voltage for generating a control voltage $V_M$ having a prescribed waveform, a comparision device having a first input coupled to the output of the power factor amplifier and a second input responsive to a voltage determined by current flow through said semiconductor switch, and means coupling pulse width modulated voltage pulses developed at an output of the comparison device to a control electrode of the semiconductor switch thereby to control the switching period thereof in a manner so as to regulate the output voltage at said converter circuit output terminal and to provide power factor correction of an input current supplied to said converter circuit input terminals.

12. A voltage control device as claimed in claim 11, wherein said first, second and third impedance elements comprise first, second and third resistors, repectively.

13. An electronic voltage control device comprising:
a converter circuit including an inductor and a semiconductor controlled switch coupled in series circuit to a pair of input terminals for a periodically varying voltage and further coupled to a load output terminal at which an output voltage is produced, a power factor amplifier having an input coupled to at least one of said input terminals for receiving at least a part of said periodic voltage, said power factor amplifier including means independent of said output voltage and responsive to said periodic voltage for generating a control voltage $V_M$ having a prescribed waveform, a comparison device having a first input coupled to an output of the power factor amplifier and a second input responsive to a voltage determined by current flow through said semiconductor switch, and means coupling pulse width modulated voltage pulses developed at an output of the comparison device to a control electrode of the semiconductor switch thereby to control the switching period thereof in a manner so as to regulate the output voltage at said converter circuit output terminal and to provide power factor correction of an input current supplied to said converter circuit input terminals.

14. A voltage control device as claimed in claim 13 which includes a current sensing element connected in a part of said series circuit which does not carry any load current, said sensing element being operative to develop said voltage for the second input of the comparison device.

15. An electronic voltage control device comprising:
a converter circuit including an inductor and a semiconductor controlled switch coupled to a pair of input terminals for a periodically varying voltage and further coupled to a load output terminal, a power factor amplifier having an input coupled to at least one of said input terminals for receiving at least a part of said periodic voltage, said power factor amplifier including means responsive to said periodic voltage for generating a control voltage $V_M$ having a prescribed waveform, an error amplifier having a first input coupled to a source of reference voltage, a second input coupled to said load output terminal, and an output coupled to a first input of a multiplier circuit to supply thereto a voltage proportional to the average value of an output voltage at said load output terminal, said multiplier circuit having a second input coupled to an output of the power factor amplifier and an output, a comparison device having a first input coupled to the output of the multiplier circuit and a second input responsive to a voltage determined by current flow through said semiconductor switch, and means coupling pulse width modulated voltage pulses developed at an output of the comparison device to a control electrode of the semiconductor switch thereby to control the switching period thereof in a manner so as to regulate the output voltage at said converter circuit output terminal and to provide power factor correction of an input current supplied to said converter circuit input terminals.

* * * * *